3,595,835
THERMOSTABILIZED LINEAR POLYESTERS OR COPOLYESTERS
Eberhard Pilz, Bobingen uber Augsburg, and Klaus Hoheisel and Eberhard Werner, Wiesbaden-Biebrich, Germany, assignors to Kalle Aktiengesellschaft, Wiesbaden-Biebrich, Germany
No Drawing. Filed Dec. 2, 1968, Ser. No. 780,571
Claims priority, application Germany, Dec. 4, 1967, P 16 94 550.9
Int. Cl. C08g 51/58
U.S. Cl. 260—45.85
10 Claims

ABSTRACT OF THE DISCLOSURE

This invention relates to a thermostabilized linear polyester or copolyester containing calcium acetate and phosphorous acid in a molar ratio in the range of 1:(0.1 to 0.8) and at least one additional phosphorus-containing stabilizer. The quantity of the phosphorous acid is in the range of 0.005 to 1 percent by weight and the quantity of the additional phosphorus-containing stabilizer is in the range of 0.001 to 5 percent by weight, both calculated on the quantity of the diester component employed.

---

It is known that linear polyesters or copolyesters which are used as base materials for the production of fibers, filaments, films, coatings, injection-molded articles or the like having improved friction characteristics are obtained in a process which combines a catalyst system based on calcium, e.g. calcium acetate, with phosphorous acid, a precipitate being obtained in the base material which, during later processing imparts the "slip" to the product produced therefrom. The phosphorous acid simultaneously acts as a stabilizer and imparts adequate thermostability to the polyester during processing.

The desired friction characteristics also may be achieved afterwards by the addition of pigments, glass powder, and the like, but these processes have the common disadvantage that the subsequent incorporation of additives into the polyester results in processing difficulties so that obtaining the desired slipping properties by means of the catalyst system offers further advantages.

Suitable linear polyesters or copolyesters preferably are obtained from terephthalic acid dimethyl ester and ethylene glycol, using the known re-esterification and polycondensation catalysts.

In addition to terephthalic acid, other aliphatic or aromatic dicarboxylic acids or disulfonic acids also may be employed as acid components in the production of polyesters. The following are exemplary: phthalic acid, isophthalic acid, oxalic acid, adipic acid, sebacic acid, azelaic acid, naphthalen-2,6-disulfonic acid or diphenyl dicarboxylic acid. In addition to alkylene glycolo, aliphatic, cycloaliphatic or aromatic diols having from 2 to 14 carbon atoms may be used as the diol component, e.g. diethylene glycol, butylene glycol, polyethylene glycol, cyclohexane dimethanol, neopentylene glycol, as well as hydroquinone or dihydroxynaphthalene. The dicarboxylic acid and diol components may consist of individual compounds or of mixtures of compounds.

At the present time, processing into the above-mentioned shaped articles requires a base material having improved thermostability, but it has been found that, with an increase of the phosphorus content in the polyester, the thermostability increases only slowly and the improved slipping characteristics are completely lost. This becomes particularly noticeable in thin films to be used as electroinsulating films.

The present invention provides shaped articles from linear polyesters, particularly from polyethylene terephthalate, having improved thermostability and optimum slipping characteristics.

In order to obtain optimum slipping characteristics, the thermostabilized linear polyesters or copolyesters according to the present invention contain calcium acetate and phosphorous acid in a molar ratio in the range of 1:(0.1 to 0.8) and at least one additional phosphorus-containing stabilizer. The quantity of the phosphorous acid is in the range of 0.005 to 1 percent by weight and the quantity of the additional phosphorus-containing stabilizer is in the range of 0.001 to 5 percent by weight, both calculated on the quantity of the diester component employed as a precursor of the polyester.

Additional phosphorus-containing stabilizers are aromatic phosphites, particularly phosphites substituted in the phenyl nucleus by aliphatic hydrocarbon groups, e.g. tri-p-tert.-butylphenyl-phosphite, aromatic thiophosphites such as trithiophenyl phosphite, aromatic thiophosphates or at least one of the compounds of the general formula

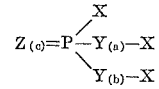

wherein
$a$, $b$, and $c$ are 0 or 1,
$Z$ is oxygen,
$Y$ is oxygen or sulfur, and
$X$ is a straight-chain or branched-chain saturated hydrocarbon having not more than 10, preferably 4 to 8 carbon atoms, phenyl, or a phenyl group substituted by aliphatic hydrocarbon groups.

Particularly favorable results are obtained when the polyesters or copolyesters contain 0.01 to 0.5 percent by weight of the additional phosphorus-containing stabilizer and the content of phosphorous acid is 0.01 to 0.05 percent by weight.

It was unexpected that the polyesters or copolyesters, although having a relatively large phosphorous content, possess excellent slipping characteristics and improved thermostability. Even a synergistic alternating effect of the suitable stabilizers with phosphorous acid seems to be decisive for the improved thermostability of the polyesters by the addition of the stabilizers of the invention.

The phosphorous-containing stabilizers of the invention are added to the known reaction mixtures together with the phosphorous acid, individually or dissolved in a glycol, after re-esterification and before the end of the polycondensation at tempertaures in the range from 215 to 250° C.

It has been found that the thermostability of the polyester or copolyester products of the combination calcium acetate, phosphorous acid and phosphorus-containing stabilizer of the invention is by far better than that of the products produced only in the presence of calcium acetate and phosphorous acid.

The invention will be further illustrated by reference to the following examples. In the examples, the percentages by weight refer to the quantity of the diester component employed, in particular of dimethyl terephthalate.

EXAMPLE 1

600 parts by weight of dimethyl terephthalate and 480 parts by weight of ethylene glycol to which 0.0767 percent by weight of calcium acetate has been added are dissolved together in a reaction vessel with heating and stirring and then re-esterified while distilling off methanol over a heated reflux condenser. Towards the end of the re-esterification process, 0.011 percent by weight of $H_3PO_3$ and 0.0163 percent by weight of tributyl phosphine in a glycol solution are added at a temperature between 215 and 250° C.; 0.04 percent by weight of Sb₂O₃ is added as condensation catalyst. While separating the excess of ethylene glycol, the temperature in the reactor is raised to 225° C. and, at this temperature, evacuation is begun and continued until a pressure of 0.3 mm. Hg is finally reached. In accordance with a predetermined heating program, the temperature is raised to 280° C. concurrently with the evacuation process. Thermostable, colorless products are thus obtained which have an intrinsic viscosity of 0.68.

The thermostability of the polyester products thus obtained is tested as follows:

Approximately 10 g. of granulated polyester are heated to 300° C. in an electrically heated metal block having a recess 10 mm. wide and a 1 mm. hole-type nozzle thereon which can be unscrewed. By means of a stamp, the melt is extruded after the polyester in the recess of the metal block is heated to 300° C. for 20 minutes. This thermally decomposed polyester is tested to determine the percentage viscosity decrease and carboxyl group increase thereof. The results are given in Table I below.

EXAMPLE 2

600 parts by weight of dimethyl terephthalate and 480 parts by weight of ethylene glycol to which 0.0767 percent by weight of calcium acetate has been added are dissolved together in a reaction vessel with stirring and heating and then re-esterified while distilling off methanol. Towards the end of the re-esterification process, 0.011 percent by weight of H₃PO₃ and 0.0228 percent by weight of phenyl diphenoxy phosphine in a glycol solution are added at a temperature between 215 and 250° C.

Polycondensation is effected as described in Example 1. Thermostable, colorless products are obtained. Data are given in Table I below.

EXAMPLE 3

By analogy to the procedure of Example 2, a thermostable, colorless polyester is obtained which has an intrinsic viscosity of 0.68, using 0.039 percent by weight of tri-p-tert.-butylphenylphosphite as a stabilizer. Data are given in Table I below.

EXAMPLE 4

Following the procedure described in Example 2, a similarly thermostable, colorless polyester is obtained which has an intrinsic viscosity of 0.68, using 0.028 percent by weight of trithiophenylphosphite as a stabilizer.

The results obtained are given in Table I below, together with a control value.

What is claimed is:

1. A thermostabilized linear polyester containing calcium acetate and phosphorous acid in a molar ratio in the range of 1:(0.1 to 0.8) and at least one phosphine of the general formula

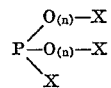

in which n is 1 or 0, and

X is selected from the group consisting of a straight-chain or branched-chain saturated hydrocarbon having not in excess of 10 carbon atoms, a phenyl group, and a phenyl group substituted by aliphatic hydrocarbon groups, the quantity of the phosphorous acid being in the range of 0.005 to 1 percent by weight and the quantity of phosphine being in the range of 0.001 to 5 percent by weight, both calculated on the weight of the diester component employed as a precusor of the polyester.

2. A thermo stabilized polyester according to claim 1 in which the phosphine is selected from the group consisting of tributyl-phosphine and phenyl-diphenoxy-phosphine.

3. A thermostabilized linear polyester according to claim 1 in which the content of phosphorous acid is in the range of 0.01 to 0.05 percent by weight, and the content of phosphine is in the range of 0.01 to 0.5 percent by weight.

4. A thermostabilized linear polyester according to claim 1 having a decrease in viscosity less than about 17 percent and a carboxyl group increase less than about 60 percent after heating for 20 minutes at a temperature of 300° C.

5. A thermostabilized linear polyester according to claim 1 in which the polyester is polyethylene terephthalate.

6. A shaped article made from a thermostabilized linear polyester containing calcium acetate and phosphorous acid in a molar ratio of 1:(0.1 to 0.8) and at least one phosphine of the general formula

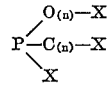

in which n is 1 or 0, and

X is selected from the group consisting of a straight-chain or branched-chain saturated hydrocarbon hav-

TABLE I

| | | Stabilizer | | Decomposition behavior after 20 minutes at 300° C. | |
|---|---|---|---|---|---|
| | Recipe, percent by weight [1] | | Percent by weight [1] | Mole per mole of DMT | Decrease in viscosity, percent | Increase in COOH groups, percent |
| Example 1 | Ca(CH₃COO)₂ 0.0767%; Sb₂O₃ 0.04%; H₃PO₃ 0.011%. | Tributylphosphine | 0.0163 | 1.57·10⁻⁴ | 8.6 | 54.5 |
| Example 2 | Ca(CH₃COO)₂ 0.0767%; Sb₂O₃ 0.04%; H₃PO₃ 0.011%. | Phenyl-diphenoxyphosphine | 0.0228 | 1.57·10⁻⁴ | 12.8 | 52.6 |
| Example 3 | Ca(CH₃COO)₂ 0.0767%; Sb₂O₃ 0.04%; H₃PO₃ 0.011%. | Tri-p-tert.-butylphenylphosphite | 0.039 | 1.57·33⁻⁴ | 15.9 | 4.47 |
| Example 4 | Ca(CH₃COO)₂ 0.0767%; Sb₂O₃ 0.04%; H₃PO₃ 0.011%. | Trithiophenylphosphite | 0.028 | 1.57·10⁻⁴ | 13.2 | 42.8 |
| Comparison values | Ca(CH₃COO)₂ 0.0767%; Sb₂O₃ 0.04%; H₃PO₃ 0.011%; | | | | 19.2 | 135 |

[1] The percentages are calculated upon the quantity of dimethyl terephthalate employed.

NOTE.—DMT=dimethyl terephthalate.

It will be obvious to those skilled in the art that many modifications may be made within the scope of the present invention without departing from the spirit thereof, and the invention includes all such modifications.

ing not in excess of 10 carbon atoms, a phenyl group, and a phenyl group substituted by aliphatic hydrocarbon groups, the quantity of the phosphorous acid being in the range of 0.005 to 1 percent by weight and the quantity of phosphine being in the range of 0.001 to 5 percent by weight, both calculated on the weight of the diester component employed as a precursor of the polyester.

7. A shaped article according to claim 6 in which the phosphine is selected from the group consisting of tributyl-phosphine and phenyl-diphenoxy-phosphine.

8. A shaped article according to claim 6 in which the content of phosphorous acid is in the range of 0.01 to 0.05 percent by weight, and the content of phosphine is in the range of 0.01 to 0.5 percent by weight.

9. A shaped article according to claim 1 in which the thermostabilized linear polyester has a decrease in viscosity less than about 17 percent and a carboxyl group increase less than about 60 percent after heating for 20 minutes at a temperature of 300° C.

10. A shaped article according to claim 1 in which the polyester is polyethylene terephthalate.

References Cited

UNITED STATES PATENTS

| | | | |
|---|---|---|---|
| 2,437,232 | 3/1948 | Rothrock et al. | 260—75 |
| 3,053,809 | 9/1962 | Linville | 260—75 |
| 3,171,828 | 3/1965 | Isaacs et al. | 260—75 |
| 3,300,440 | 1/1967 | Prevorsek | 260—45.7 |
| 3,361,846 | 1/1968 | Gleim | 260—75 |

DONALD E. CZAJA, Primary Examiner

V. P. HOKE, Assistant Examiner

U.S. Cl. X.R.

260—45.7, 75